United States Patent [19]

Iwasa et al.

[11] 4,086,891
[45] May 2, 1978

[54] INTAKE SYSTEM FOR INTERNAL COMBUSTION ENGINES, PARTICULARLY FOR INTERNAL COMBUSTION ENGINES OF THE TYPE WHEREIN AN AUXILIARY COMBUSTION CHAMBER IS ASSOCIATED WITH EACH MAIN COMBUSTION CHAMBER AND CONNECTED BY A TORCH NOZZLE

[75] Inventors: Yoshio Iwasa, Nagareyama; Yoji Ito, Yokohama, both of Japan

[73] Assignee: Nissan Motor Company, Limited, Japan

[21] Appl. No.: 674,768

[22] Filed: Apr. 8, 1976

[30] Foreign Application Priority Data

Apr. 9, 1975 Japan .................................. 50-43054

[51] Int. Cl.² ............................................ F02M 31/00
[52] U.S. Cl. .............................. 123/122 AB; 261/144; 261/145; 123/122 AC
[58] Field of Search ................. 123/122 AB, 122 AC, 123/32 ST, 32 SP; 261/144, 145

[56] References Cited

U.S. PATENT DOCUMENTS

| | | | |
|---|---|---|---|
| 1,437,395 | 12/1922 | Brush ............................. | 123/122 AC |
| 3,850,153 | 11/1974 | Sigwald ......................... | 123/122 AB |
| 3,955,546 | 5/1976 | Lee ................................ | 123/122 AC |
| 3,964,460 | 6/1976 | Nakano ......................... | 123/122 AB |

*Primary Examiner*—Ronald H. Lazarus

[57] ABSTRACT

An intake system comprises an intake manifold having a heat riser and a plurality of manifold passages extending from the heat riser to cylinders of an engine. The heat riser is heated by exhaust gases from the engine and a cooling liquid jacket conducts the engine cooling liquid around the intake manifold.

8 Claims, 6 Drawing Figures

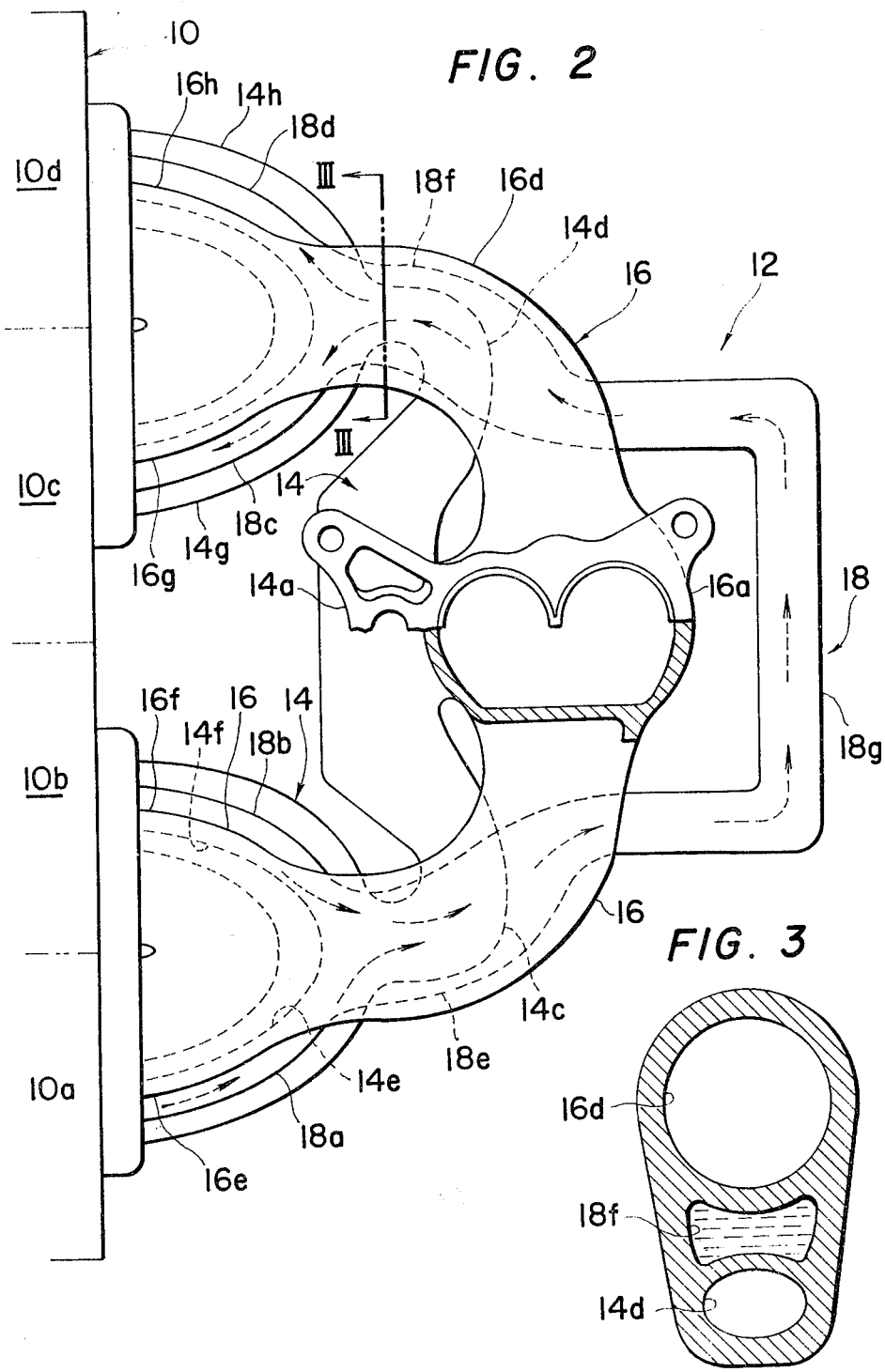

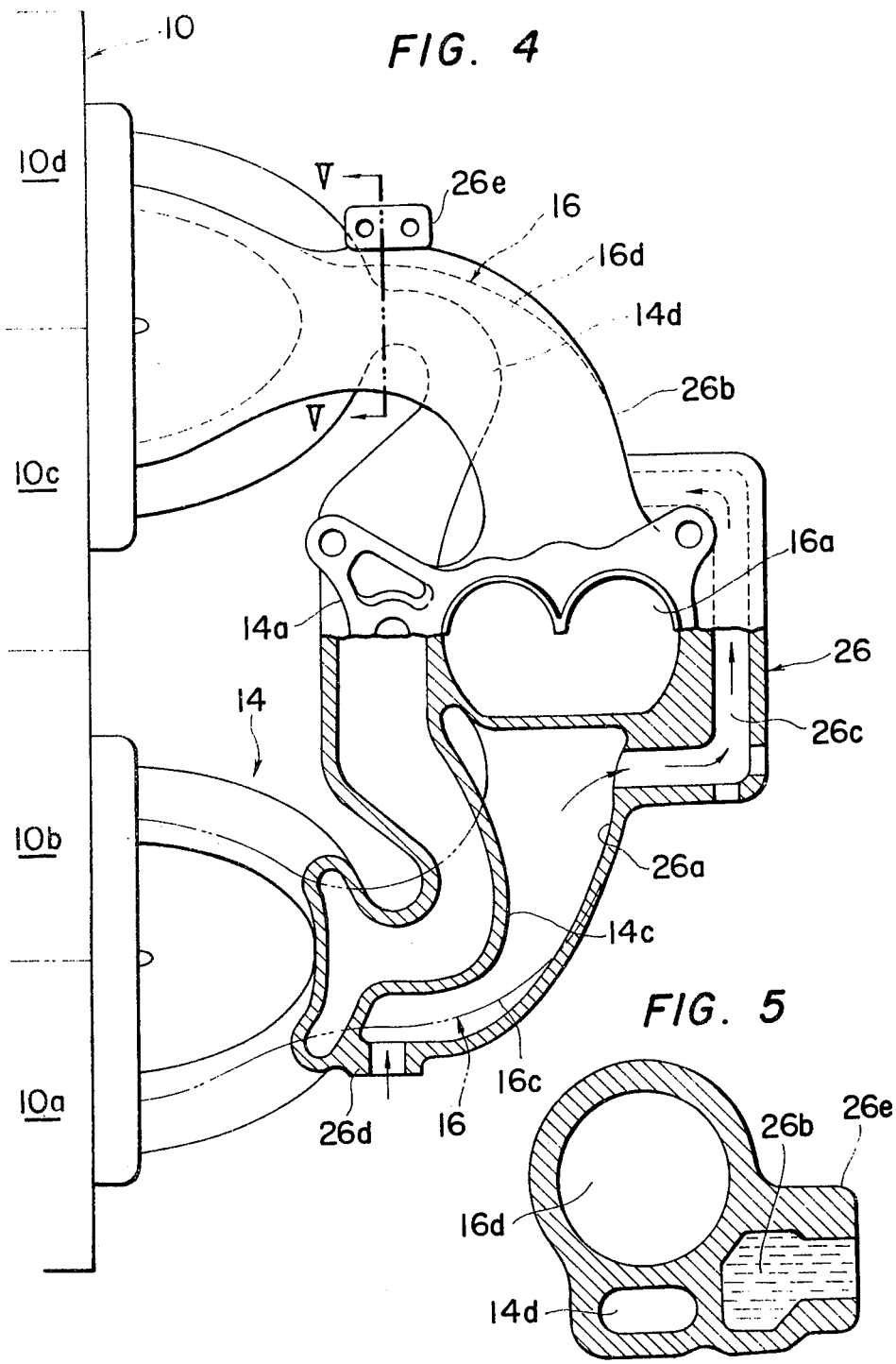

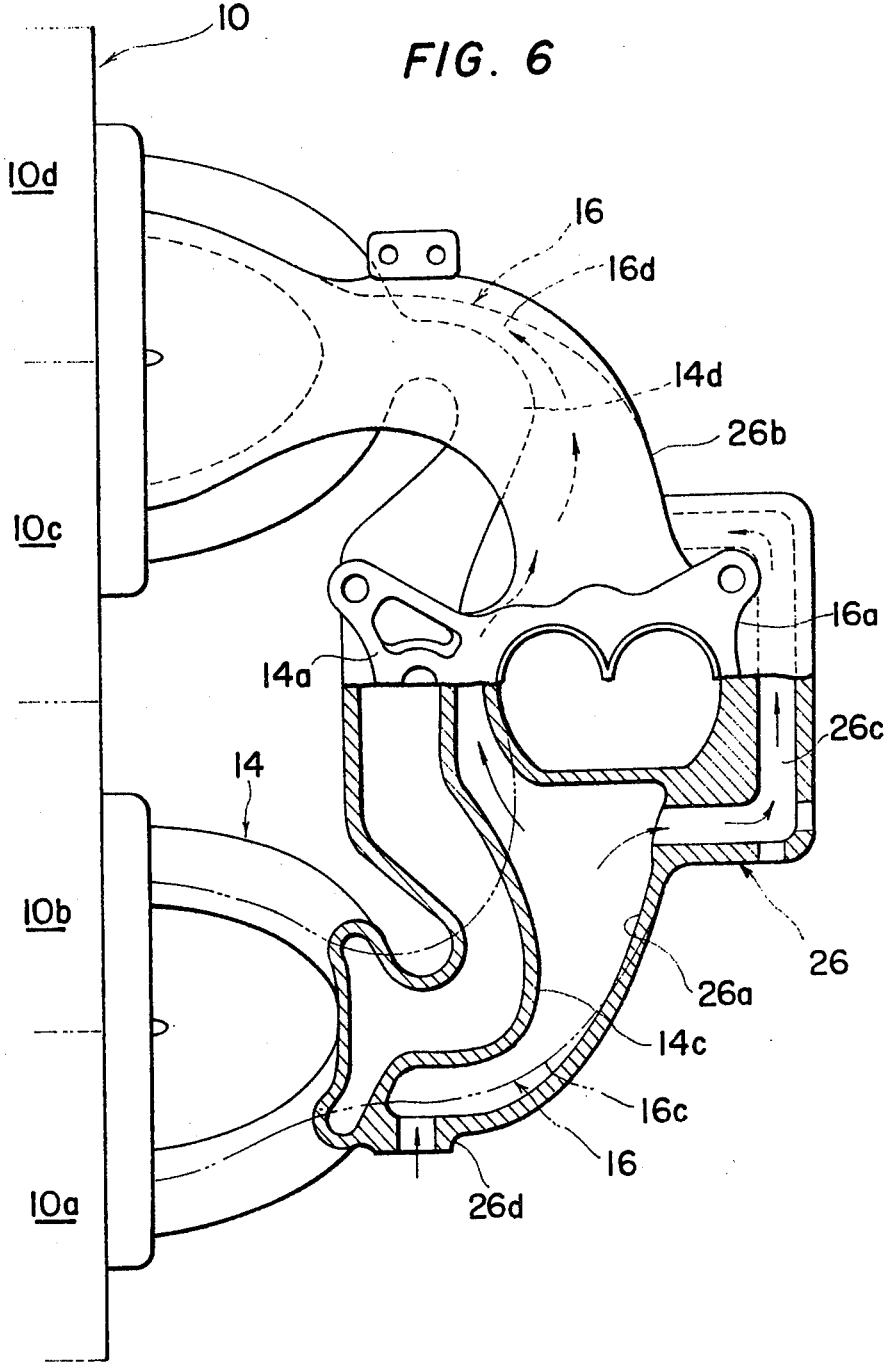

INTAKE SYSTEM FOR INTERNAL COMBUSTION ENGINES, PARTICULARLY FOR INTERNAL COMBUSTION ENGINES OF THE TYPE WHEREIN AN AUXILIARY COMBUSTION CHAMBER IS ASSOCIATED WITH EACH MAIN COMBUSTION CHAMBER AND CONNECTED BY A TORCH NOZZLE

The present invention generally relates to an intake system for an internal combustion engine, and more particularly to an intake system for an internal combusting engine of the type wherein an auxiliary combustion chamber is associated with each main combustion chamber and connected by a torch nozzle.

Internal combustion engines of the type having an auxiliary combustion chamber associated with each main combustion chamber are known. In these engines a small amount of rich air fuel mixture is supplied to each auxiliary combustion chamber, while, a large amount of lean air fuel mixture is supplied to each main combustion chamber. The rich mixture is ignited in the auxiliary combustion chamber and then passes through a torch nozzle into the main combustion chamber where it ignites the lean mixture in the main combustion chamber. Good vaporization of fuel of the rich and lean mixtures is prerequisite to efficient combustion in the engines, and it is known to heat the heat risers of an auxiliary and main intake manifolds with exhaust gases or bypass cooling liquid from the cooling system of the engine to effect better fuel vaporization. One difficulty with this method resides in the fact that once the auxiliary and main intake manifolds of the engine have become hot they heat the intake air and thus the quantity of fuel that enter each cylinder reduces so that as a result horsepower and efficiency of the engine reduce. Saying more particularly, if the heat risers of the auxiliary and main intake manifolds are designed to have heat exchange capacity high enough for sufficient vaporization of fuel to improve the starting of the engine under cold weather and the subsequent warming-up operation of the engine, the intake mixtures tend to be overheated when the engine is operating under heavy load in which the temperature and the amount of exhaust gases are significantly high. When the lean mixture is overheated, the quantity of fuel that enter each main combustion chamber reduces, while when the rich mixture is overheated and expanded, the charge in each auxiliary combustion chamber tends to enter mostly into the associated main combustion chamber and thus fails to provide a sufficient torch flame. As a result horsepower of the engine reduces and incomplete combustion deteriorates exhaust gases from the engine.

To eliminate the above mentioned problem a thermostatically controlled valve has been installed in some engines of the above character so that the exhaust gases may bypass the heat risers to reduce the heating thereof. This valve however is located directly in the exhaust manifold and normally corrodes after a period of engine operation so that it becomes inoperative for the purpose intended.

An object of the present invention is to provide an intake system whereby it is possible to effect better vaporization of fuel throughout various modes of engine operation so that the starting of the engine is improved without overheating of the mixture during the engine operation under heavy load.

Another object of the present invention is to provide an intake system of the above character which has no mechanically movable parts.

The above objects, features and advantages of the present invention will become clear from the following description in connection with the accompanying drawings, in which:

FIG. 1 is a diagrammatic longitudinal sectional view of a manifold system including first preferred embodiment of an intake system according to the present invention, for an internal combustion engine of the type wherein an auxiliary combustion chamber is associated with each main combustion chamber and connected by a torch nozzle and wherein combustion is initiated by the fuel rich mixture in the auxiliary combustion chamber and a torch nozzle resulted from the combustion ignites the fuel lean mixture in the main combustion chamber through the torch nozzle;

FIG. 2 is a plan view of the intake system shown in FIG. 1 illustrating the distribution arrangement to the four cylinders;

FIG. 3 is a sectional view taken through the line III—III of FIG. 2;

FIG. 4 is a plan view of a second preferred embodiment of an intake system according to the present invention, with a main intake manifold partly eliminated and with an auxiliary intake manifold and a cooling liquid jacket partly broken away;

FIG. 5 is a sectional view taken through line V—V of FIG. 4; and

FIG. 6 is a similar view to FIG. 4 showing a third preferred embodiment of an intake system according to the present invention.

Figure 1:
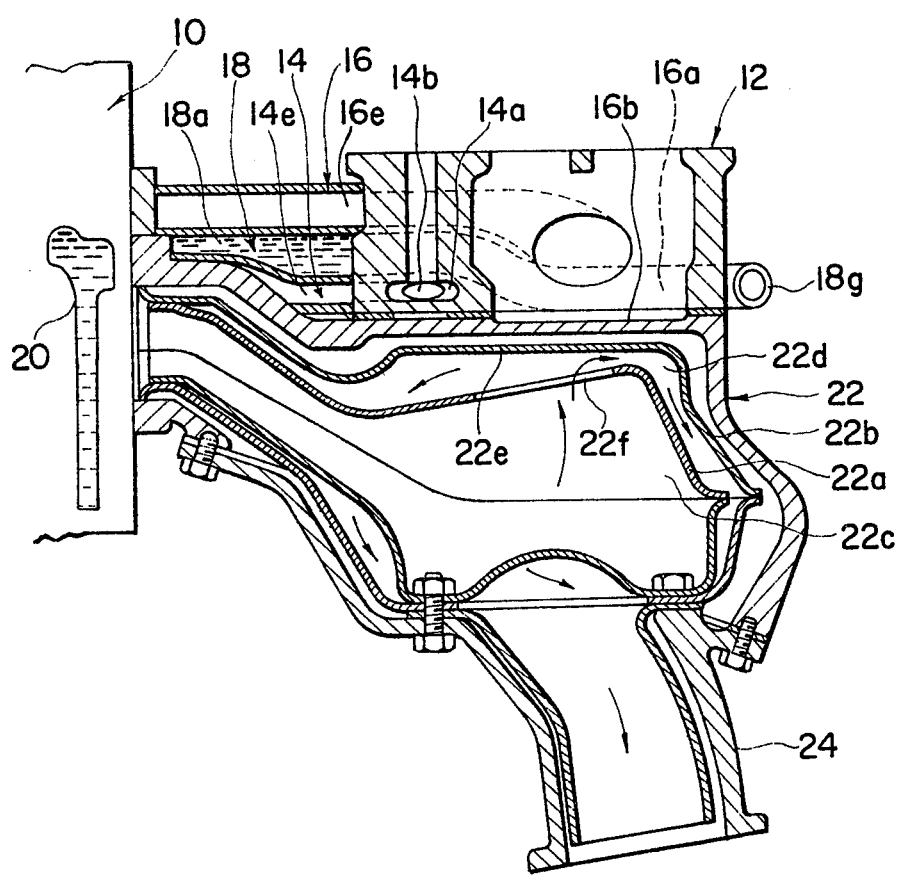

In the presently-described embodiments, the invention is applied to a four-cylinder in line engine, illustrated by 10, of the type wherein per each cylinder an auxiliary combustion chamber is associated with a main combustion chamber and connected by a torch nozzle.

Referring to the first embodiment shown in FIGS. 1 through 3, the engine 10 has four cylinders respectively designated by 10a, 10b, 10c and 10d (see FIG. 2), and each of the cylinders has an auxiliary combustion chamber (not shown) connected to a main combustion chamber (not shown) through a torch nozzle (not shown) in the conventional manner as is well known in the art.

An intake system, generally designated at 12, comprises an auxiliary intake manifold 14 for distributing a small amount of rich air fuel mixture to all the auxiliary combustion chambers and an main intake manifold 16 for distributing a large amount of lean air fuel mixture to all the main combustion chambers. The auxiliary and main intake manifolds 14 and 16 include heat risers 14a and 16a, respectively, whose bottoms 14b and 16b are heated by exhaust gases. As best seen in FIG. 2, extending outwardly from the heat riser 14a are two intake pipes 14c and 14d, each splitting into two intake pipes 14e and 14f or 14g and 14h to meet auxiliary intake ports (not shown) formed in the engine head of the engine 10 which direct the fuel rich mixture to two auxiliary combustion chambers. Extending outwardly from the heat riser 16a of the main intake manifold 16 are two intake pipes 16c and 16d, each splitting into two branches 16e and 16f or 16g and 16h to meet main intake ports (not shown) formed in the engine head of the engine 10 which direct the fuel lean mixture to two main combustion chambers.

The branches 14e, 14f, 14g and 14h of the auxiliary intake manifold 14 and the branches 16e, 16f, 16g and 16h of the main intake mainfold 16 are either adjacent to or integral with branches 18a, 18b, 18c and 18e of a cooling liquid jacket 18, respectively. The juxtaposition between each of the branches of the auxiliary intake manifold, such as 14e, each of the branches of the water jacket, such as 18a and each of the branches of the main intake manifold, such as 16e provides for substantial heat transfer between 14e and 18a and between 16e and 18a (see FIG. 1). The cooling liquid jacket 18 is connected by its branches 18a, 18b, 18c and 18d directly to cooling liquid passages 20 formed within the engine block of the engine 10 so that the engine cooling liquid may be directed to the jacket 18. The branches 18a and 18b are split from a pipe 18e which is either adjacent to or integral with at least portions of the auxiliary and main intake pipes 14c and 16c to provide for substantial heat transfer between 14c and 18e and between 16c and 18e, while the branches 18c and 18d are split from a pipe 18f which is either adjacent to or integral with at least portions of the auxiliary and main intake pipes 14d and 16d to provide for substantial heat transfer between 14d and 18f and between 16d and 18f (see FIG. 3). The pipes 18e and 18f are interconnected by a pipe 18g extending around but separated from the heat riser 16a. The cooling liquid jacket 18 should be so designed that there may be no or slight heat transfer between the auxiliary manifold heat riser 14a and the jacket 18 and between the main manifold heat riser 16a and the jacket 18.

The bottoms 14b and 16b of the heat risers are heated by the exhaust gases within an exhaust manifold, generally designated by 22, as illustrated in FIG. 1. Within the exhaust manifold 22 are installed dual walled liners 22a and 22b. The inner liner or core 22a defines a thermal reaction chamber for exhaust gases 22c and the outer liner or core 22b defines a chamber 22d around the reaction chamber 22c and a heater wall 22e which is disposed adjacent to the riser bottoms 14b and 16b to heat the auxiliary and main manifold risers 14a and 16a. The inner liner 22a is formed with an opening 22f at upper wall of the reaction chamber 22c. The chamber 22d surrounding the reaction chamber 22c and the opening 22f are designed so that the hot exhaust gases may be directed to the heater wall 22e and then flow all the way around the reaction chamber 22a and finally enter an exhaust pipe 24, the flow of exhaust gases being illustrated by solid arrows in FIG. 1.

From the preceding description of the preferred embodiment illustrated in FIGS. 1 through 3 it will be understood that because the engine cooling liquid of the engine cooling system serves to absorb excessive heat from the intake mixtures when the engine 10 is operated under heavy load, the heat exchange capacity of the heat risers 14a and 16a can be increased high enough for rapid and effective vaporization of fuel, thus improving the starting of the engine under cold weather and the subsequent operation after the startup, without overheating of the intake mixtures which would deteriorate the operation of the engine 10 under heavy load.

The second embodiment illustrated in FIGS. 4 and 5 is basically similar to the first embodiment described in the preceding and the similar parts in the second embodiment to those in the first embodiment are represented by the same reference numerals. However the difference resides in arrangement of a cooling liquid jacket.

A cooling liquid jacket 26 shown in FIGS. 4 and 5 is different from the jacket 18 in that the former has eliminated the branches 18a, 18b, 18c and 18e, and pipes 26a and 26b of the water jacket 26 are disposed on the opposite sides of a main intake manifold heat riser 16a and each of them extends along intake pipes 14c and 16c or pipes 14d and 16d. The passages 26a and 26b are interconnected by a passage 26c extending around the heat riser 16a. The cooling liquid jacket 26 is connected by an inlet connector 26d and outlet connector 26e to the cooling system of an engine 10. Preferably the inlet connector 26d is connected to cooling circuit of the engine cooling system adjacent to and upstream of a thermostat (not shown) and the outlet is connected to the coolant circuit adjacent to and the suction side of a pump (not shown). It is to be noted that the cooling liquid jacket 25 provides for heat transfer not only with the branches 14c, 16c, 14d and 16d but also with the heat riser 16a.

Although, in the second embodiment, the cooling liquid jacket 26 is in contact only with the heat riser 16a, it may be in contact with both of the heat risers 14a and 16a as illustrated in FIG. 6.

Although in the preceding two embodiments the manifold heat risers 14a and 16a are heated by the exhaust gases, they may be heated by bypass cooling liquid from the engine cooling system.

Although the manifold risers 14a and 16a are heated by radiation from the heat wall 22e which is heated by the exhaust gases, they may be heated directly by the exhaust gases, thus increasing efficiency in heat transfer from the exhaust gases to the intake mixtures.

It will now be appreciated that according to the present invention the heat exchange capacities of the manifold risers may be increased sufficiently high enough for rapid fuel vaporization during engine operation under low temperatures, because the water jacket prevents overheating of the intake mixtures during engine operation under heavy load, thus improving startup of and the subsequent operation of the engine without significant loss of the maximum horse power of the engine.

It will also be appreciated that because of the provision of the water jacket a proper torch flame is insured during all the engine operations.

What is claimed is:
1. In an internal combustion engine
   a plurality of cylinders, each having a main combustion chamber, an auxiliary combustion chamber, and a torch nozzle interconnecting said main combustion chamber and said auxiliary combustion chamber;
   a main intake manifold means for distributing a large amount of lean air fuel mixture to said main combustion chambers, said main intake manifold means comprising a main heat riser bottom wall and a plurality of main intake pipes, each extending outwardly from said main heat riser toward at least one of said cylinders;
   an auxiliary intake manifold means for distributing a small amount of rich air fuel mixture to said auxiliary combustion chambers, said auxiliary intake manifold means comprising an auxiliary heat riser having a bottom wall and a plurality of auxiliary intake pipes, each extending outwardly from said auxiliary heat riser toward at least one of said cylinders;
   an exhaust manifold means for conveying hot exhaust gases discharged from said main combustion chambers toward the atmosphere, said exhaust manifold means being in heat conductive contact with said bottom wall of said main heat riser and of said auxiliary heat riser so that said walls are heated with the exhaust gases discharged from said main combustion chambers throughout all operating conditions of said engine;

a cooling liquid jacket communicating with a liquid cooling system of said engine so that cooling liquid flows through said cooling liquid jacket, said cooling liquid jacket in heat conductive contact with said plurality of main intake pipes for heat transfer between the cooling liquid and the lean air fuel mixture in said plurality of main intake pipes, and also with said plurality of auxiliary intake pipes for heat transfer between the cooling liquid and the rich air fuel mixture in said plurality of auxiliary intake pipes.

2. In an internal combustion engine as claimed in claim 1, in which said cooling liquid jacket is out of contact with said main and auxiliary heat risers.

3. In an internal combustion engine as claimed in claim 1, in which each of said main intake pipes splits into two branches, each connecting with one of said cylinders of the engine, and each of said auxiliary intake pipes splits into two branches, each connecting with one of said cylinders of the engine, and in which said cooling liquid jacket extends along and contacts with said two branches of each of said main intake pipes and said two branches of each of said auxiliary intake pipes, and in which said cooling liquid jacket is out of contact with said main and auxiliary heat risers.

4. In an internal combustion engine as claimed in claim 1, in which said cooling liquid jacket extends along and contacts with said plurality of main intake pipes and with said auxiliary intake pipes, an in which said cooling liquid jacket contacts with said main heat riser but is out of contact with said auxiliary heat riser.

5. In an internal combustion engine as claimed in claim 1, in which each of said main intake pipes splits into two branches, each connecting with one of said cylinders of the engine, and each of said auxiliary intake pipes splits into two branches, each connecting with one of said cylinders of the engine, and in which said cooling liquid jacket extends along and contacts a portion of each of said main intake pipes between said two branches of each of said main intake pipes and said main heat riser and a portion of each of said auxiliary intake pipes between said two branches of each of said auxiliary intake pipes and said auxiliary heat riser, and said cooling liquid jacket contacts with said main heat riser but is out of contact with said auxiliary heat riser.

6. In an internal combustion engine as claimed in claim 1, in which said cooling liquid jacket extends along and contacts with each of said main intake pipes and each of said auxiliary intake pipes, and in which said cooling liquid jacket contacts with said main and auxiliary heat risers.

7. Method for controlled heating of the intake system for an internal combustion engine comprising a plurality of cylinders, each having a main combustion chamber, an auxiliary combustion chamber, and a torch nozzle interconnecting said main combustion chamber and said auxiliary combustion chamber, said intake system comprising;

a main intake manifold means for distributing a large amount of lean air mixture to said main combustion chambers, said main intake manifold means comprising a main heat riser and a plurality of main intake pipes, each extending outwardly from said main heat riser toward at least one of said cylinders;

an auxiliary intake manifold means for distributing a small amount of rich air fuel mixture to said auxiliary combustion chambers, said auxiliary intake manifold means comprising an auxiliary heat riser and a plurality of auxiliary intake pipes, each extending outwardly from said auxiliary heat riser toward at least one of said cylinders; said method comprising;

utilizing exhaust gases discharged from said main combustion chambers to heat said main and auxiliary heat risers; and utilizing liquid coolant having passed through said cylinders to heat at least said plurality of main intake pipes and said plurality of auxiliary intake pipes, whereby the fuel can be rapidly vaporized with the heat of the exhaust gases during start-up and the subsequent warming-up of the engine under cold weather, while, when the engine operates under heavy load, the liquid coolant absorbs excessive heat from the lean and rich air fuel mixtures.

8. Method for controlled heating of the intake system for an internal combustion engine comprising a plurality of cylinders, each having a main combustion chamber, an auxiliary combustion chamber, and a torch nozzle interconnecting said main combustion chamber and said auxiliary combustion chamber, said intake system comprising;

a main intake manifold means for distributing a large amount of lean air fuel mixture to said main combustion chambers, said main intake manifold means comprising a main heat riser and a plurality of main intake pipes, each extending outwardly from said main heat riser toward at least one of said cylinders;

an auxiliary intake manifold means for distributing a small amount of rich air fuel mixture to said auxiliary combustion chambers, said auxiliary intake manifold means comprising an auxiliary heat riser and a plurality of intake pipes, each extending outwardly from said auxiliary heat riser toward at least one of said cylinders; said method comprising:

heating the bottoms of said main and auxiliary heat risers with exhaust gases discharged from said main combustion chambers throughout all operating conditions of the engine; and contacting liquid coolant having passed through said cylinders with at least said plurality of main intake pipes and said plurality of auxiliary intake pipes, whereby the fuel can be rapidly vaporized with the heat of the exhaust gases during start-up and the subsequent warming-up of the engine under cold weather, while, when the engine operates under heavy load, the liquid coolant absorbs excessive heat from the lean and rich air fuel mixtures.

* * * * *